US012261385B2

(12) United States Patent
Amini et al.

(10) Patent No.: US 12,261,385 B2
(45) Date of Patent: Mar. 25, 2025

(54) POWER CONNECTOR WITH ASYMMETRIC INSERTION-TO-EXTRACTION FORCE RATIO

(71) Applicant: Apple Inc., Cupertino, CA (US)

(72) Inventors: Mahmoud R. Amini, Sunnyvale, CA (US); Deep Karpe, Sunnyvale, CA (US); James M. Jeon, Mountain House, CA (US); Richard P. Howarth, San Francisco, CA (US); Rui Zhou, Sunnyvale, CA (US); Unhyi Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 17/891,109

(22) Filed: Aug. 18, 2022

(65) Prior Publication Data

US 2023/0283002 A1 Sep. 7, 2023

Related U.S. Application Data

(60) Provisional application No. 63/317,486, filed on Mar. 7, 2022.

(51) Int. Cl.
*H01R 13/24* (2006.01)
*H01R 4/18* (2006.01)
(Continued)

(52) U.S. Cl.
CPC ........... *H01R 13/2421* (2013.01); *H01R 4/18* (2013.01); *H01R 13/58* (2013.01);
(Continued)

(58) Field of Classification Search
CPC ...... H01R 13/2421; H01R 4/18; H01R 13/58; H01R 13/6215; H01R 13/6456; H01R 13/648; H01R 24/22; H01R 13/6395; H01R 2103/00; H01R 24/70; H01R 13/6583; H01R 13/629; H01R 13/5845; H01R 13/6581
See application file for complete search history.

(56) References Cited

U.S. PATENT DOCUMENTS 2,117,967 A 5/1938 Albin et al.
2,404,564 A 7/1946 Boehlke
(Continued)

FOREIGN PATENT DOCUMENTS

EP 2590273 5/2013
TW I318025 12/2009
(Continued)

OTHER PUBLICATIONS

U.S. Consumer Product Safety Commission, "Consumer Product Safety Review", Winter 2002, vol. 6, No. 3, 2002, 6 pages.
(Continued)

*Primary Examiner* — Briggitte R. Hammond
(74) *Attorney, Agent, or Firm* — Kilpatrick Townsend & Stockton LLP

(57) ABSTRACT

Power connector systems that can have an asymmetric insertion-to-extraction force ratio such that they are easy to mate and can reliably remain connected during use. The power connector systems can have a low-profile for use in thin electronic devices.

20 Claims, 7 Drawing Sheets

(51) Int. Cl.

| | |
|---|---|
| ***H01R 13/58*** | (2006.01) |
| ***H01R 13/621*** | (2006.01) |
| ***H01R 13/645*** | (2006.01) |
| ***H01R 13/648*** | (2006.01) |

(52) U.S. Cl.
CPC ..... *H01R 13/6215* (2013.01); *H01R 13/6456* (2013.01); *H01R 13/648* (2013.01)

(56) References Cited

U.S. PATENT DOCUMENTS

| | | | |
|---|---|---|---|
| 2,519,933 | A | 8/1950 | Rouault |
| 4,025,964 | A | 5/1977 | Owens |
| 4,947,846 | A | 8/1990 | Kitagawa et al. |
| 4,978,306 | A | 12/1990 | Robb |
| 5,606,237 | A | 2/1997 | Biasotti et al. |
| 5,980,290 | A | 11/1999 | Meynier et al. |
| 6,267,602 | B1 | 7/2001 | Mendelson et al. |
| 6,283,796 | B1 | 9/2001 | Yeh |
| 6,848,937 | B1 | 2/2005 | Hsiao |
| 6,866,527 | B2 | 3/2005 | Potega |
| 6,976,878 | B2 | 12/2005 | Shindo |
| 7,175,441 | B2 | 2/2007 | Naviaux et al. |
| 7,311,526 | B2 | 12/2007 | Rohrbach et al. |
| 7,625,213 | B1 | 12/2009 | Tse |
| 7,722,259 | B2 | 5/2010 | Smith, III et al. |
| 8,450,610 | B2 | 5/2013 | Alvelo et al. |
| 8,469,730 | B2 | 6/2013 | Garb et al. |
| 8,491,332 | B1 | 7/2013 | Mo et al. |
| 8,888,500 | B2 | 11/2014 | Gao et al. |
| 8,979,549 | B2 | 3/2015 | Lin |
| 9,011,169 | B2 * | 4/2015 | Russell ................ H01R 13/187 439/271 |
| 9,065,205 | B2 | 6/2015 | Gao et al. |
| 10,276,950 | B1 | 4/2019 | Amini et al. |
| 10,344,402 | B2 | 7/2019 | Sanders et al. |
| 10,431,944 | B1 | 10/2019 | Su et al. |
| 11,165,196 | B2 | 11/2021 | Yonnet et al. |
| 11,374,367 | B2 | 6/2022 | Johnson et al. |
| 11,381,033 | B2 | 7/2022 | Johnson et al. |
| 11,450,999 | B2 | 9/2022 | SooHoo et al. |
| 2005/0234521 | A1 | 10/2005 | Balsells |
| 2008/0261430 | A1 | 10/2008 | Wadsworth |
| 2009/0154883 | A1 | 6/2009 | Robb |
| 2010/0279558 | A1 | 11/2010 | Leon et al. |
| 2011/0081788 | A1 | 4/2011 | Robb |
| 2011/0207360 | A1 | 8/2011 | Jordan |
| 2013/0244493 | A1 | 9/2013 | Powley |
| 2014/0065845 | A1 | 3/2014 | Ando et al. |
| 2014/0273546 | A1 | 9/2014 | Harmon et al. |
| 2016/0049753 | A1 | 2/2016 | SooHoo et al. |
| 2016/0127643 | A1 | 5/2016 | Huerta et al. |
| 2017/0250578 | A1 | 8/2017 | Kallman et al. |
| 2018/0138633 | A1 | 5/2018 | Dewitt et al. |
| 2019/0190187 | A1 | 6/2019 | Fukazawa et al. |
| 2022/0102923 | A1 | 3/2022 | Amini et al. |

FOREIGN PATENT DOCUMENTS

| | | |
|---|---|---|
| WO | 2015027239 | 2/2015 |
| WO | 2017044640 | 3/2017 |

OTHER PUBLICATIONS

National Presto Industries, Inc., “Magnetic Cord for Electric Deep Fryers”, National Presto Industries, Inc., Available online At: http://www.gopresto.com/productslproductslphp?stock=09982, Jan. 18, 2006, 1 page.

Dowell Trading Co. Ltd., “News for Break Away Power Cords on Electric Deep Fryers”, Dowell Trading Co, Ltd.,, Jul. 4, 2001, 1 page.

“Presto 9984 Control Master Heat Control With Magnetic Cord”, Available online At: http://www.cookingandcanning.net/pr99comaheco.html, Jan. 18, 2006, 1 page.

“Zojirushi Hot Water Dipensing Pot Review”, Available online At: http://www.pkshiu.com/loft/archive/2005/01/zojirusji-hot-water-dispensing-pot-review, Jan. 5, 2005, 1 page.

Cnn.com, “Break-Away Cord Aims to Make Deep Fryers Safer”, CNN.com, Available online At: http:larchives.cnn.com/2001 /US/07 /03/deep.fryers/, Jul. 4, 2001, 2 pages.

* cited by examiner

POWER CONNECTOR WITH ASYMMETRIC INSERTION-TO-EXTRACTION FORCE RATIO

CROSS-REFERENCE TO RELATED APPLICATIONS

This application claims the benefit of U.S. Provisional Application No. 63/317,486, filed on Mar. 7, 2022, which is incorporated by reference.

BACKGROUND

The number of types of electronic devices that are commercially available has increased tremendously the past few years and the rate of introduction of new devices shows no signs of abating. Devices such as tablet computers, laptop computers, all-in-one computers, desktop computers, cell phones, storage devices, wearable-computing devices, portable media players, portable computing devices, navigation systems, monitors, adapters, and others, have become ubiquitous.

Some of these electronic devices can receive power through power cords that are connected to power converters—colloquially referred to as bricks—that are in turn connected to wall sockets or outlets. These power cords can have a connector insert that can be inserted into a connector receptacle in the electronic device. These connector receptacles are often located in a rear surface or rear panel of the electronic device. For example, these power cords can have a connector insert that is inserted into connector receptacle in a direction that is orthogonal to a rear of the electronic device. This configuration can make it difficult for the connector insert to be inserted by a user positioned at a front side of the electronic device. It can therefore be desirable to provide a connector insert and connector receptacle that can be easily mated. Once mated, it can be desirable that these connections have a high retention force such that they are firmly held in place and do not inadvertently disconnect during use.

Many of these electronic devices have become slimmer over time. To save space and improve the appearance of these electronic devices, manufactures are continuing to provide even slimmer or thinner devices. But the size of a connector receptacle, particularly its depth, can limit a device's thickness. Accordingly, it can be desirable to provide connector receptacles having a low-profile.

Thus, what is needed are power connector systems that can have a low profile and an asymmetric insertion-to-extraction force ratio such that they are easy to mate and can reliably remain connected during use.

SUMMARY

Accordingly, embodiments of the present invention can provide power connector systems that can have a low profile and an asymmetric insertion-to-extraction force ratio such that they are easy to mate and can reliably remain connected during use.

An illustrative embodiment of the present invention can provide a power connector system that is easy to connect by providing a connector receptacle and connector insert having a low insertion force. A canted coil spring can be used to provide a tactile response during the insertion of the connector insert into the connector receptacle. The connector insert can be configured to operate with the canted coil spring such that the canted coil spring provides a low physical resistance to an insertion of the connector insert, thereby requiring a low insertion force for mating. The connector insert can be further configured to operate with the canted coil spring such that the canted coil spring provides a higher resistance to the extraction of the connector insert to help to secure the connector insert in place when mated with the connector insert. This can provide a high retention force thus requiring a high extraction force for removal of the connector insert.

These and other embodiments of the present invention can provide a connector receptacle having a low profile. This connector receptacle can include a housing having a recess defined by a sidewall and a bottom surface. The sidewall can include a keying feature to match a keying feature on a corresponding connector insert to facilitate the alignment of the corresponding connector insert with the connector receptacle during mating. The keying feature can extend from the sidewall in a direction parallel to the bottom of the recess. The recess can be shallow such that the sidewall has a limited height. A canted coil spring can be located in a groove in the sidewall. The recess can support base portions of a plurality of power prongs, where the power prongs extend from the bottom surface of the recess. A lead frame can be routed laterally under the bottom surface of the recess to further reduce the height of the connector receptacle. The lead frame can connect at least two of the prongs to wires. The wires can terminate in a connector.

The housing can be formed of a top housing portion and a bottom housing portion. The top housing portion can include a top sidewall portion and the bottom housing portion can include a bottom sidewall portion and the bottom surface of the recess. The groove for the canted coil spring can be between the top sidewall portion and the bottom sidewall portion.

The prongs can be positioned in different ways in the bottom of the recess. To avoid mis-insertion of a corresponding connector insert, the prongs can be offset from being centered around a midpoint of the recess. That is, two or more of the prongs can be spaced a different distance from the center of the recess. The prongs can also have an angular spacing that is different from 360 degrees divided by the number of prongs. For example, where three prongs are used, the angular spacing can be different than 120 degrees. The prongs can have the same or different heights. For example, a ground prong can be longer such that a ground connection is formed first during insertion and broken last during an extraction.

The connector receptacle can be shielded by a shield that includes a top shield portion and a bottom shield portion. The top shield portion and the bottom shield portion can be attached. A tab can be attached to the bottom shield portion. The tab can extend through a slot in the bottom housing portion and fit in a cutout in a backside of the top housing portion. The tab can contact the coil spring to improve grounding. The ground prong can be physically and electrically connected to the bottom shield portion. Insulation tape can be placed between the lead frame and the bottom shield portion to improve electrical isolation. For example, two layers of insulation tape can be used. These layers can have openings or notches for the tab that is attached to the bottom shield portion such that it can contact the canted coil spring, and for the ground prong such that the ground prong can be physically and electrically connected to the bottom shield portion. These layers can have openings or notches for fasteners, including a grounding fastener. The connector receptacle can be attached to a housing, enclosure, or other portion of an electronic device using these fasteners or other attachment structures. For example, fasteners can extend through openings in the bottom shield portion, through the layers of insulation tape, through openings in the bottom housing portion and top housing portion, through openings in the top shield portion, and into threaded holes in the housing or enclosure of the electronic device.

These and other embodiments of the present invention can provide a connector insert having a low profile. This connector insert can include a cable having an end molded in a strain relief. The cable can include a number of conductors each having a crimp at an end. The crimps can each attach to a tab on a corresponding contact. The contacts can be tulip-type contacts having a number of petals. The contacts can each have barbs and each barb can be inserted into a corresponding slot in an inner insulator. The inner insulator can be positioned around a portion of the strain relief. A contact cover can fit over a portion of the strain relief and the inner insulation. The contact cover can include a number of openings, each to provide access to one of the contacts. An outer housing can fit over a portion of the strain relief, the inner insulator, and sides of the contact cover. The outer housing and the contact cover can include a keying feature to match a keying feature on a corresponding connector receptacle to facilitate the alignment of the connector insert with the connector receptacle during mating.

The outer housing of the connector insert can have a surface that works in conjunction with the canted coil spring in the connector receptacle to provide a power connector system with a low insertion force and a high retention force. This can make it easy to form a connection between a connector insert and a connector receptacle, while ensuring that a sufficient retention force is present such that the connector insert is held firmly in place in the connector receptacle during operation. For example, the outer housing can have a front end having a narrow contour. That is, it can have a front contour with a smaller diameter. This front contour can engage the canted coil spring. A widening contour of the outer housing can follow the narrow front contour. This can increase the diameter of the canted coil spring. A narrower trench can follow the widening contour of the outer housing. The canted coil spring can be positioned in the trench, and can therefore be constrained, while the connector insert is inserted in the connector receptacle. When the canted coil spring of the connector receptacle is in the trench on the surface of the outer housing of the connector insert, the canted coil spring can provide a large resistance to an extraction of the connector insert, thereby increasing the retention force on the connector insert helping to keep the connector insert in place in the connector receptacle during operation.

In these and other embodiments of the present invention, contacts, shields, prongs, lead frames, and other conductive portions of a power connector can be formed by stamping, progressive stamping, forging, metal-injection molding, deep drawing, machining, micro-machining, computer-numerically controlled (CNC) machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with nickel, gold, or other material.

The nonconductive portions, such as housings, contact covers, inner insulators, strain reliefs, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide power connectors including connector receptacles that can be located in various types of devices, such as tablet computers, laptop computers, desktop computers, all-in-one computers, cell phones, storage devices, wearable-computing devices, portable computing devices, portable media players, navigation systems, monitors, adapters, and other devices, as well as corresponding connector inserts.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
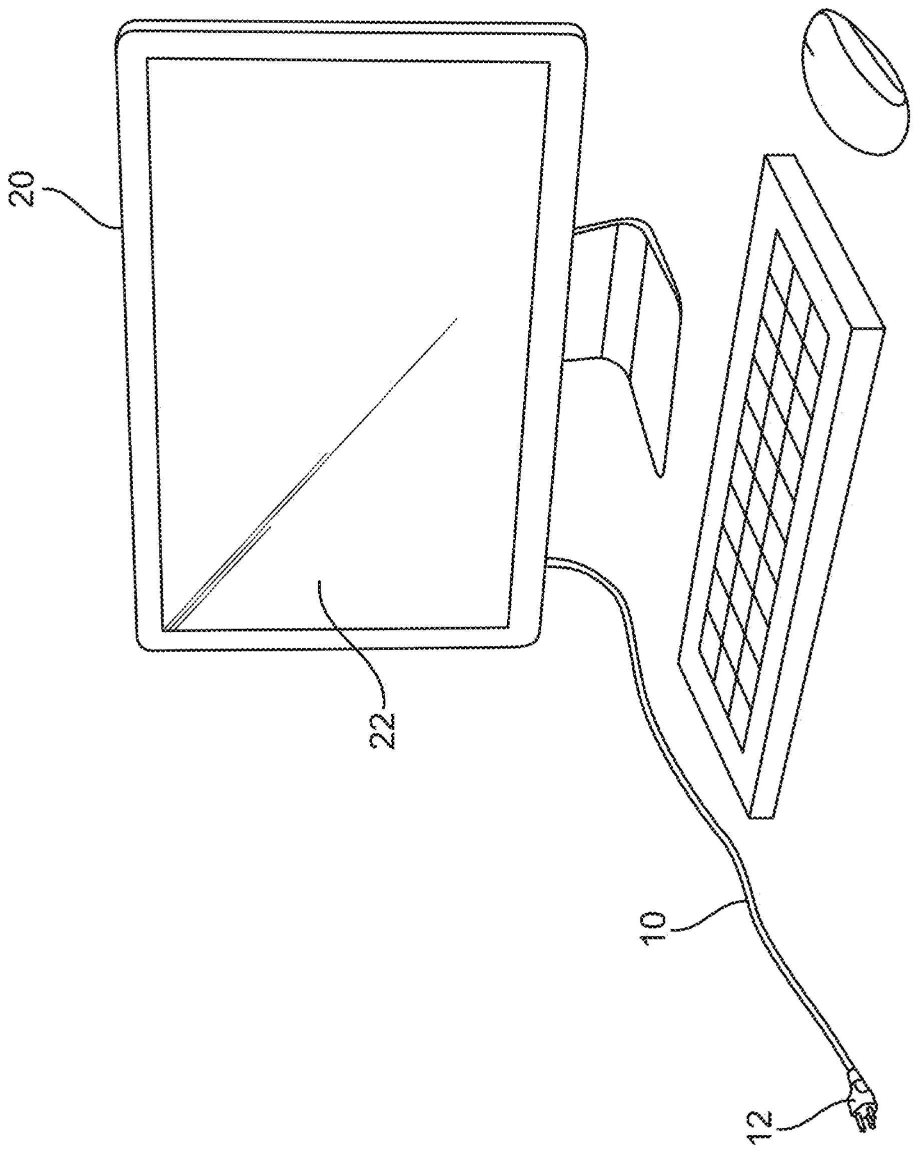
FIG. 1 illustrates an electronic system that can be improved by the incorporation of an embodiment of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

This example illustrates an electronic device 20 having a screen 22. Electronic device 20 can be powered through power cord 10, which can include a power plug 12 at a first end. Power plug 12 can be configured to plug into a wall socket or outlet. Power cord 10 can be attached to a power converter or brick (not shown.) The power converter can be connected to a cable having a connector insert 300 (shown in FIG. 4) that can plug into a connector receptacle 100 (shown in FIG. 2) located on a rear side or other portion of electronic device 20. Electronic device 20 can be a monitor, desktop computer, all-in-one computer, or other electronic device. In these and other embodiments of the present invention, other devices, such as tablet computers, laptop computers, cell phones, storage devices, wearable-computing devices, portable media players, portable computing devices, navigation systems, adapters, and other devices, can be powered using connector receptacle 100.

Figure 2:
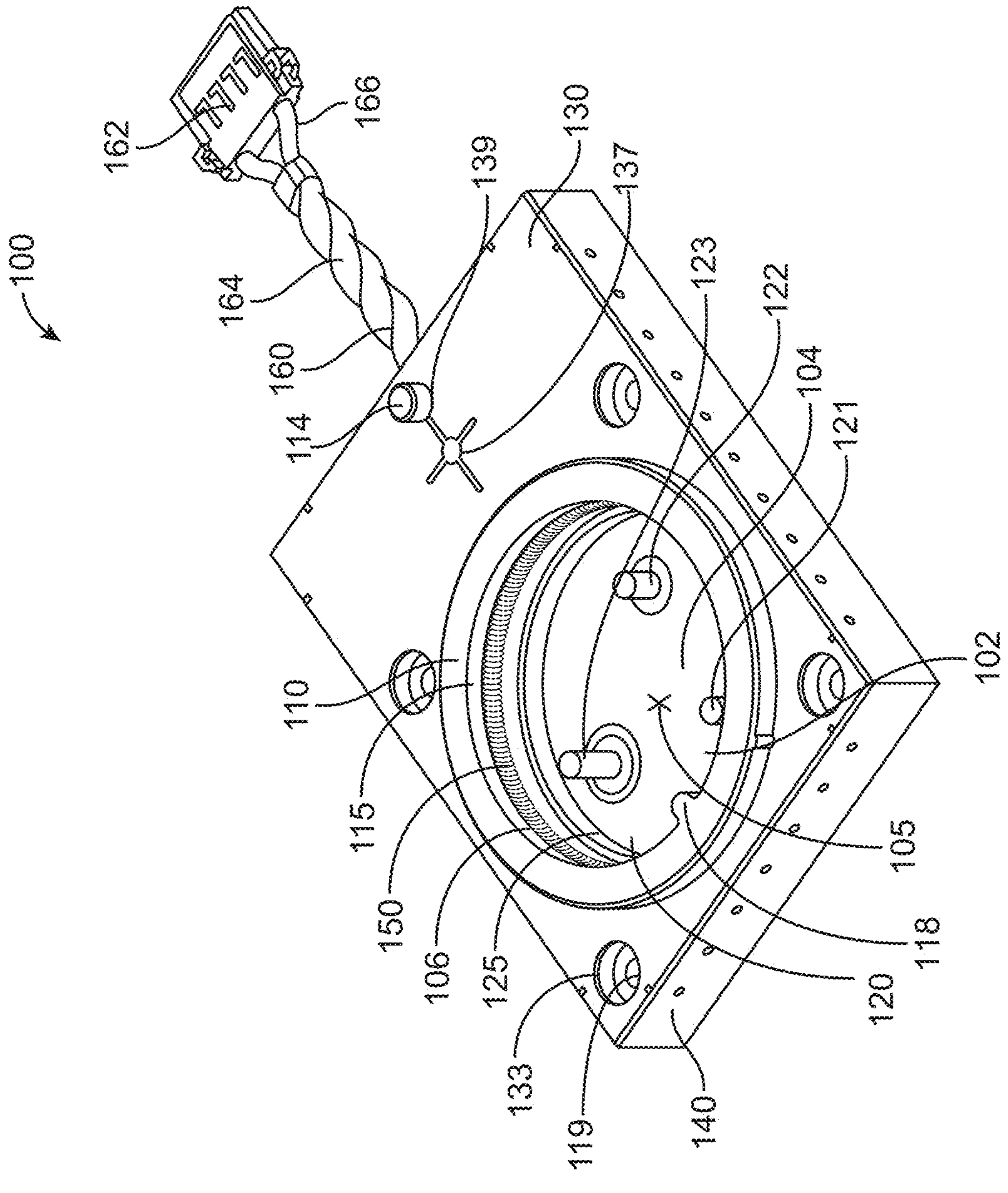
FIG. 2 illustrates a connector receptacle according to an embodiment of the present invention.

FIG. 2 illustrates a connector receptacle according to an embodiment of the present invention. Connector receptacle 100 can be a low-profile connector receptacle having a height that is sufficient for a canted coil spring, which can set an insertion and extraction force profile, and a number of power prongs, which can be used to convey power and ground. That is, connector receptacle 100 can include a recess 102 defined by a sidewall 106 and a bottom surface 104, where the recess 102 is shallow and the height of the sidewall 106 is limited. In this example, recess 102 can include a sidewall 106 that includes top sidewall portion 115, which is a portion of top housing portion 110, as well as bottom sidewall portion 125 and bottom surface 104, which can be portions of bottom housing portion 120. Canted coil spring 150 can be located in groove 153 (shown in FIG. 7.) Canted coil spring 150 can be formed of stainless steel, with nickel or other plating, and can be manufactured using wire forming or other manufacturing technique.

Power prongs 121, 122, and 123 can extend from the bottom of recess 102. Power prongs 121, 122, and 123 can be positioned in different ways in the bottom of recess 102. To avoid mis-insertion of a corresponding connector insert 300 (shown in FIG. 4), power prongs 121, 122, and 123 can be offset from being centered around midpoint 105 of recess 102. That is, two or more of power prongs 121, 122, and 123 can be spaced a different distance from the midpoint 105 of recess 102. Power prongs 121, 122, and 123 can also have an angular spacing that is different from 360 degrees divided by the number of power prongs. That is, power prongs 121, 122, and 123 can have unequal angular spacings. For example, where three power prongs are used, the angular spacing can be different than 120 degrees. Power prongs 121, 122, and 123 can have the same or different heights. For example, ground prong 123 can be longer such that a ground connection is formed first during insertion and broken last during an extraction. In this example, three power prongs 121, 122, and 123 are used for three power connections, ground, line (hot), and neutral. In this example, power prong 123 can be a ground prong, power prong 121 can be a line (hot) prong, while power prong 122 can be a neutral prong. Alternatively, power prong 123 can be a ground prong, power prong 122 can be a line (hot) prong, while power prong 121 can be a neutral prong. In these and other embodiments of the present invention, other numbers of power prongs can be used, such as two, four, or more than four.

Connector receptacle 100 can be shielded by shielding that includes a top shield portion 130 and bottom shield portion 140. Top shield portion 130 and bottom shield portion 140 can be attached, for example by spot or laser-welding. Ground prong 123 can be physically and electrically connected to bottom shield portion 140. Alignment tab 114 on top housing portion 110 can fit in opening 139 to align top shield portion 130 to top housing portion 110.

Sidewall 106 can include keying feature 118 to match keying feature 322 on corresponding connector insert 300 (both shown in FIG. 4) to facilitate the alignment of the corresponding connector insert 300 with connector receptacle 100 during mating. Keying feature 118 can extend from sidewall 106 in a direction parallel to bottom surface 104 of recess 102. In these and other embodiments of the present invention, keying feature 118 can extent in different directions. For example, keying feature 118 can extend in a direction orthogonal to bottom surface 104 of recess 102. In this example, keying feature 118 is somewhat hemispherical in outline, though keying feature 118 can have other shapes in these and other embodiments of the present invention.

Leads 167 (shown in FIG. 3) of lead frame 160 can be routed laterally under bottom surface 104 of recess 102 to further reduce the height of connector receptacle 100. Leads 167 of lead frame 160 can connect at least two of the power prongs, in this example power prongs 121 and 122, to wires 166. Wires 166 can terminate in connector 162. Wires 166 can be twisted and covered by heat-shrinkable tube 164.

Connector receptacle 100 can be attached to a housing, enclosure, or other appropriate structure of an electronic device, such as electronic device 20 (shown in FIG. 1.) For example, fasteners (not shown) can be inserted into openings 143 (shown in FIG. 3) in bottom shield portion 140, through openings 124 in bottom housing portion 120 (shown in FIG. 3), openings 119 in top housing portion 110, openings 133 in top shield portion 130, and into threaded holes (not shown) in the housing, enclosure, or other appropriate structure of electronic device 20. A grounding fastener (not shown) can be inserted into opening 145 (shown in FIG. 3) in bottom shield portion 140 and opening 116 (shown in FIG. 3) in top housing portion 110, and through slot 137 in top shield portion 130. The grounding fastener can be threaded into a conductive boss (not shown) or other structure in or associated with the housing, enclosure, or other appropriate structure of electronic device 20 to provide a ground path. Slot 137 can have a "+" shape to facilitate the insertion of the grounding fastener and to improve the ground connection between the top shield portion 130 and the conductive boss.

Figure 3:
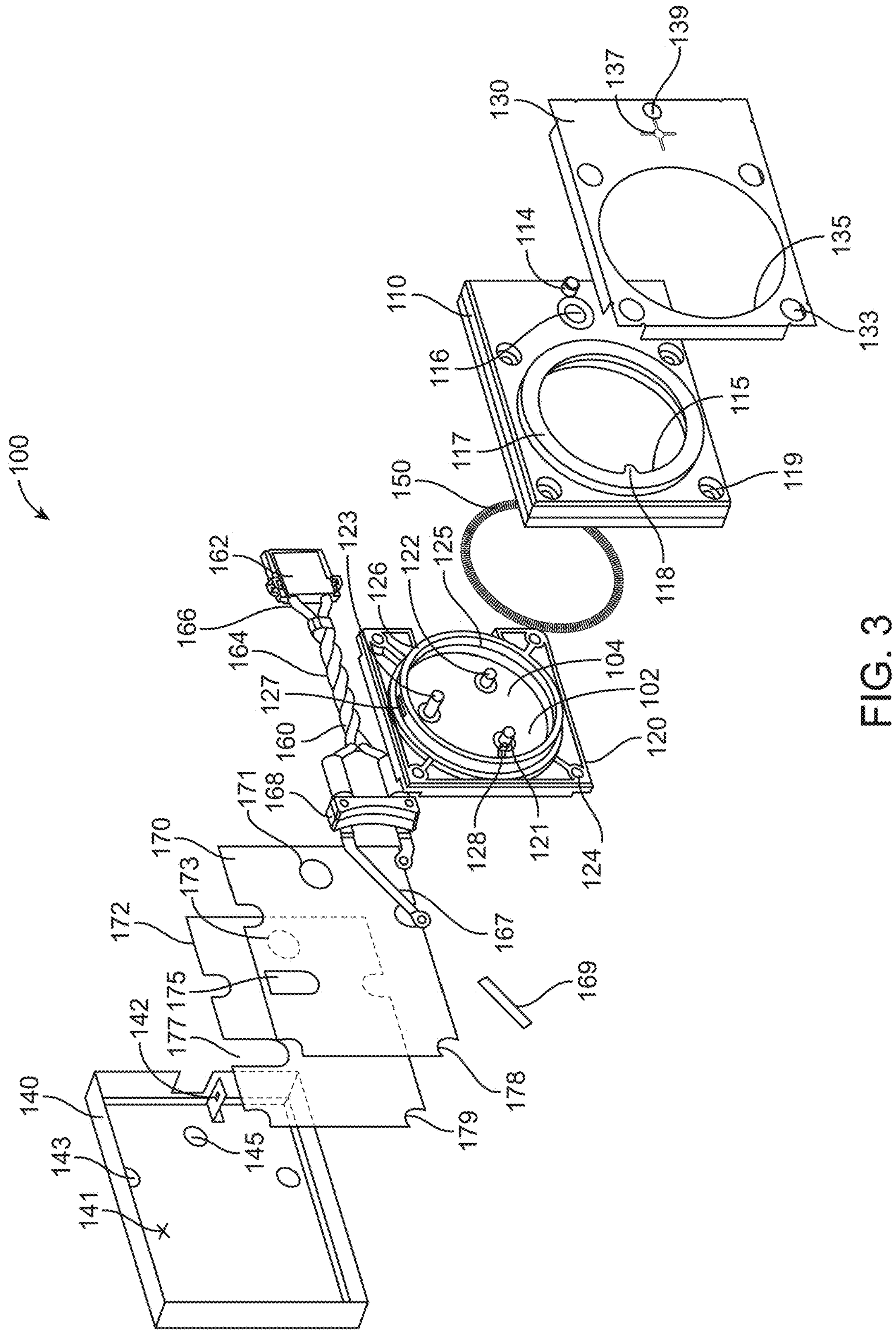
FIG. 3 is an exploded view of the connector receptacle of FIG. 2.

FIG. 3 is an exploded view of the connector receptacle of FIG. 2. Connector receptacle 100 can have a low profile. Connector receptacle 100 can include housing formed of top housing portion 110 and bottom housing portion 120 having a recess 102 defined by sidewall 106 (shown in FIG. 2) and bottom surface 104. Recess 102 can be shallow such that sidewall 106 has a limited height. Canted coil spring 150 can be located in groove 153 (shown in FIG. 7) in sidewall 106. Bottom surface 104 of recess 102 can support base portions 129 (shown in FIG. 6) of power prongs 121, 122, and 123, where power prongs 121, 122, and 123 extend from bottom surface 104 of recess 102.

Connector receptacle 100 can include a housing that can be formed of top housing portion 110 and bottom housing portion 120. Top housing portion 110 can include a top sidewall portion 115. Top sidewall portion 115 can form a top portion of groove 153 that can be used to support canted coil spring 150. Top sidewall portion 115 can include a keying feature 118 to match keying feature 322 on corresponding connector insert 300 (both shown in FIG. 4) to facilitate the alignment of corresponding connector insert 300 with connector receptacle 100 during mating. Keying feature 118 can extend laterally from top sidewall portion in a direction parallel to bottom surface 104 of recess 102. Top housing portion 110 can further include alignment tab 114 that can fit in opening 139 of top shield portion 130, and alignment ring 117 that can fit in opening 135 in top shield portion 130. Top housing portion 110 can include openings 119.

Bottom housing portion 120 can include bottom sidewall portion 125 and bottom surface 104 of recess 102. Bottom housing portion 120 can include openings 124. Bottom sidewall portion 125 can include a keying feature 128 that can, along with keying feature 118, match keying feature 322 on corresponding connector insert 300 to facilitate the alignment of corresponding connector insert 300 with connector receptacle 100 during mating. Keying feature 128 can extend laterally from bottom sidewall portion in a direction parallel to bottom surface 104 of recess 102. Keying feature 128 can further extend vertically in a direction orthogonal to bottom surface 104. Keying feature 128 can fit in a hole (not shown) in an underside of keying feature 118 to help to align and secure top housing portion 110 to bottom housing portion 120. Keying feature 128 on bottom housing portion 120 can further provide mechanical support for keying feature 118 of top housing portion 110. Keying feature 128 on bottom housing portion 120 can include one or more crush-fit features to secure keying feature 128 in place in the hole in the underside of keying feature 118. Alternatively, keying feature 128 can extend from bottom sidewall portion in a different direction than one parallel to bottom surface 104 of recess 102. Keying feature 118 on top housing portion 110 can be aligned with keying feature 128 on bottom housing portion 120. Groove 153 can be between top sidewall portion 115 and bottom sidewall portion 125. Bottom housing portion 120 can be formed around or otherwise support base portions 129 (shown in FIG. 6) of power prongs 121, 122, and 123.

Power prongs 121, 122, and 123 can extend from bottom surface 104 of recess 102. Power prongs 121, 122, and 123 can be positioned in different ways in the bottom of recess 102. To avoid mis-insertion of a corresponding connector insert 300 (shown in FIG. 4), power prongs 121, 122, and 123 can be offset from being centered around midpoint 105 (shown in FIG. 2) of recess 102. That is, two or more of power prongs 121, 122, and 123 can be spaced a different distance from the midpoint 105 of recess 102. Power prongs 121, 122, and 123 can also have an angular spacing that is different from 360 degrees divided by the number of power prongs. For example, where three power prongs are used, the angular spacing can be different than 120 degrees. Power prongs 121, 122, and 123 can have the same or different heights. For example, ground prong 123 can be longer such that a ground connection is formed first during insertion and broken last during an extraction.

Leads 167 of lead frame 160 can be routed laterally under bottom surface 104 of recess 102 to further reduce the height of connector receptacle 100. Leads 167 can connect base portions 129 of at least two of the power prongs, in this example power prongs 121 and 122, to wires 166 in lead frame 160. Wires 166 can terminate in connector 162. Wires 166 can be twisted and covered by heat-shrinkable tube 164. Lead frame housing 168 can be shaped to fit along edge 126 of bottom housing portion 120 to further save space.

Connector receptacle 100 can include shielding that includes top shield portion 130 and bottom shield portion 140. Top shield portion 130 and bottom shield portion 140 can be attached, for example by laser or spot-welding. Ground prong 123 can be physically and electrically connected to bottom shield portion 140. Top shield portion 130 can include openings 133 for fasteners that can be used to attach connector receptacle 100 in electronic device 20. Top shield portion 130 can have opening 135 to provide access to recess 102.

Tab 142 can be attached, for example by soldering, laser welding, spot welding, or other technique, to bottom shield portion 140 at location 141. Tab 142 can pass through slot 127 in bottom housing portion 120 and fit in a cutout (not shown) in the back of top housing portion 110. Tab 142 can electrically contact canted coil spring 150, thereby providing a ground path for canted coil spring 150 through bottom shield portion 140.

Connector receptacle 100 can be attached to a housing, enclosure, or other appropriate structure of an electronic device, such as electronic device 20. For example, fasteners (not shown) can be inserted into openings 143 in bottom shield portion 140, through openings 124 in bottom housing portion 120, openings 119 in top housing portion 110, and openings 133 in top shield portion 130. These fasteners can then be threaded into threaded holes (not shown) in the housing, enclosure, or other appropriate structure of electronic device 20. A grounding fastener (not shown) can be inserted into opening 145 in bottom shield portion 140 and opening 116 in top housing portion 110, and through slot 137 in top shield portion 130. The grounding fastener can be threaded into a conductive boss (not shown) or other structure in or associated with the housing, enclosure, or other appropriate structure of electronic device 20 to provide a ground path. Slot 137 can have a "+" shape to facilitate the insertion of the grounding fastener and to improve the ground connection between the top shield portion 130 and the conductive boss.

Insulation tape layers 170 and 172 can be placed between leads 167 of lead frame 160 and bottom shield portion 140 to improve electrical isolation. In this example, two insulation tape layers 170 and 172 are shown, though one, three, or more than three insulation tape layers can be used. Insulation tape layer 170 can have opening 175 and insulation tape layer 172 can have slot 177 for tab 142 and ground prong 123 to be physically and electrically connected to the bottom shield portion. Insulation tape layer 170 can have four notches 178 and insulation tape layer 172 can have four notches 179 to allow the passage of the fasteners used to secure connector receptacle 100 in place in electronic device 20. Insulation tape layer 170 can have opening 171 and insulation tape layer 172 can have opening 173 to allow the passage of the grounding fastener. One or more insulation tape layers 169 can also be wrapped around one or more of the leads 167. One or more of these insulation tape layers 169, 170, and 172 can be formed of polyimide or other material, and can be die cut or shaped in other ways.

Figure 4:
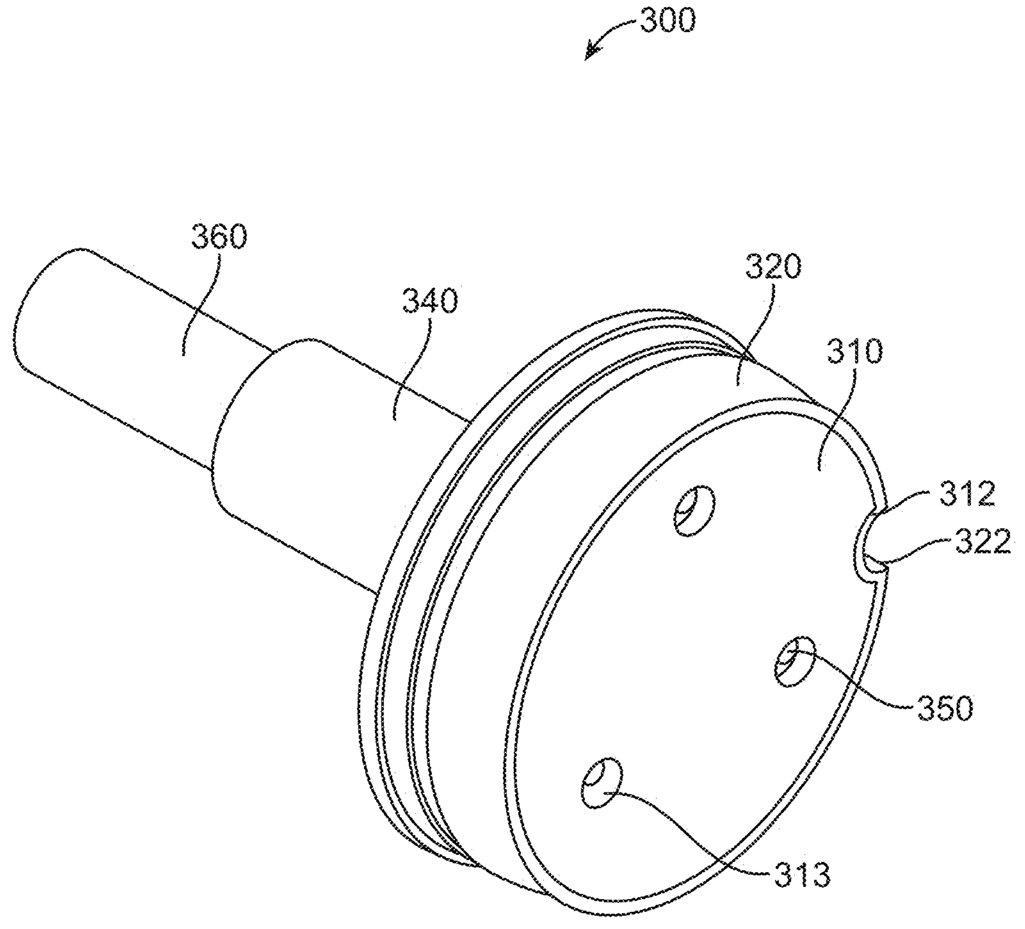
FIG. 4 illustrates a connector insert according to an embodiment of the present invention.

FIG. 4 illustrates a connector insert according to an embodiment of the present invention. These and other embodiments of the present invention can provide connector inserts, such as connector insert 300, having a low profile. Connector insert 300 can include cable 360 having an end molded in strain relief 340. The cable can include a number of conductors 362 (shown in FIG. 5) connected to contacts 350. Contacts 350 can be housed in a housing including outer housing 320 and contact cover 310. Contact cover 310 can include openings 313, each providing access for a corresponding contact 350. In this example, three openings 313 and three contacts 350 are used for three power connections, ground, line (hot), and neutral. In these and other embodiments of the present invention, other numbers of contacts 350 and openings 313 can be used, such as two, four, or more than four. Openings 313 can be tapered to ease insertion of power prongs 121, 122, and 123 (shown in FIG. 2) when connector insert 300 is mated with connector receptacle 100.

Outer housing 320 can include keying feature 322 and contact cover 310 can include keying feature 312. Keying features 322 and 312 can have somewhat hemispherical concave shapes that can be configured to fit with keying feature 118 on top housing portion 110 and keying feature 128 on bottom housing portion 120 in connector receptacle 100 (all shown in FIG. 3.) In this example, keying features 312 and 322 are shown as being concave and keying features 118 and 128 are shown as being convex. In these and other embodiments of the present invention, keying features 312 and 322 can be convex while keying features 118 and 128 can be concave. In these and other embodiments of the present invention, different shapes for keying features 118 and 128 and keying features 312 and 322 can have other shaped that are rounded, squared, or have other contours.

Figure 7:
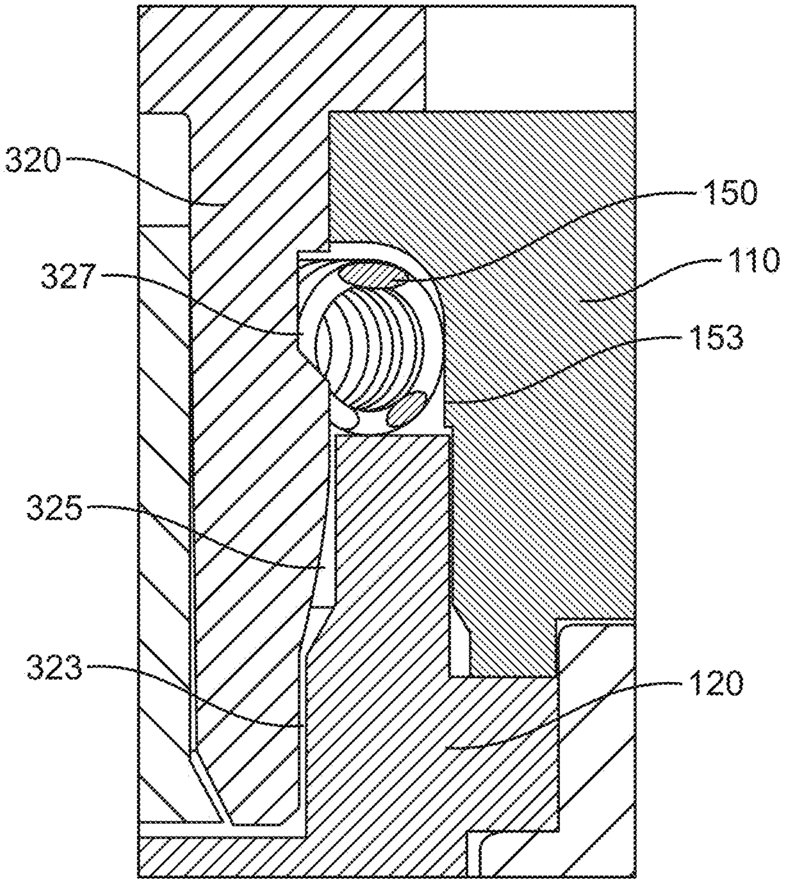
FIG. 7 illustrates a portion of a cross-section view of a power connector system according to an embodiment of the present invention.

The outside surface of outer housing 320 can include a number of contours for engaging canted coil spring 150 (shown in FIG. 3) as shown further in FIG. 7.

Figure 5:
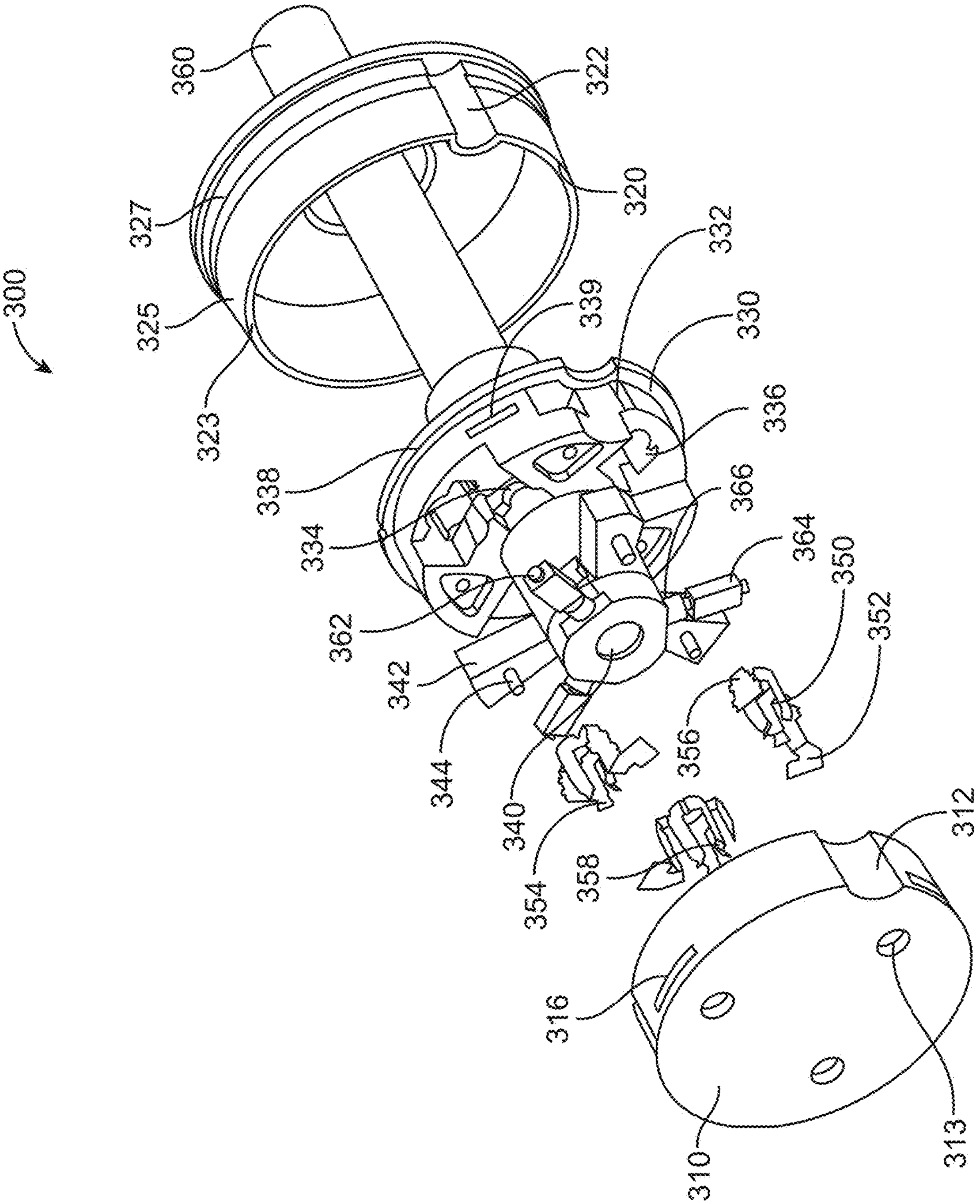
FIG. 5 is an exploded view of the connector insert of FIG. 4.

FIG. 5 is an exploded view of the connector insert of FIG. 4. Connector insert 300 can include cable 360 having an end molded in strain relief 340. The cable can include a number of conductors 362 each having a crimp 364 at an end. Cable 360 can further have a braided shielding layer (not shown), other conductors such as fiber optic cables (not shown), or other conductive or nonconductive portions.

Crimps 364 can each attach to tab 352 on a corresponding contact 350 to form electrical connections from contacts 350 to conductors 362 in cable 360. In this example, conductors 362 can include a right angle such that they extend laterally before crimp 364 and connection to contact 350. This arrangement can help to reduce a height or thickness of connector insert 300. Contacts 350 can be tulip-type contacts, each having a number of petals 354. Each petal can include a contacting portion 358 for forming an electrical connection with one of the power prongs 121, 122, or 123 of connector receptacle 100. Contacts 350 can each have barbs 356 that can each be inserted into a corresponding slot 336 in inner insulator 330. In this example, each contact 350 has three petals 354, though each contact 350 can include one, two, four, or more than four petals 354. In this example, each contact 350 has two barbs 356, though each contact 350 can include one, three, or more than three barbs 356.

Inner insulator 330 can encircle a portion of strain relief 340. Inner insulator 330 can include a cutout portion 332 for keying feature 322 on outer housing 320 and keying feature 312 on contact cover 310. Inner insulation can include slots 336 for barbs 356 on contacts 350 to secure contacts 350 in place in connector insert 300. Inner insulator 330 can include notches 334 for supporting conductors 362 and their insulation 366, if present.

Strain relief 340 can support conductors 362. Strain relief 340 can include wings 342 having tabs 344. Tabs 344 can fit in corresponding openings in an inside surface (not shown) of contact cover 310. Alternatively, tabs 344 can rest against the inside surface of contact cover 310. Strain relief 340 can protect cable 360 from wear where cable 360 would otherwise encounter outer housing 320.

Contact cover 310 can fit over portions of inner insulator 330 and strain relief 340. Contact cover 310 can rest against lip 338 of inner insulator 330. Contact cover 310 can include a number of openings 313, each to provide access to one of contacts 350. Contact cover 310 can have a notch (not shown) to accept tab 339 on inner housing such that contact cover 310 and inner insulator 330 can snap together.

Outer housing 320 can fit over a portion of strain relief 340, inner insulator 330, and sides of contact cover 310. Outer housing 320 can include a notch (not shown) on an inside surface to accept tab 316 on contact cover 310 such that outer housing 320 and contact cover 310 can snap together. Outer housing 320 can include keying feature 322 and contact cover 310 can include keying feature 312 to match keying features 118 and 128 on corresponding connector receptacle 100 to facilitate the alignment of connector insert 300 with connector receptacle 100 during mating.

Outer housing 320 of connector insert 300 can have an outer surface that works in conjunction with canted coil spring 150 in connector receptacle 100 (both shown in FIG. 2) to provide a power connector system with a low insertion force and a high retention force. This can make it easy to form a connection between connector insert 300 and connector receptacle 100, while ensuring that a sufficient retention force is present such that connector insert 300 is held firmly in place in connector receptacle 100 during operation. The interaction of canted coil spring 150 and outer housing 320 is shown further in FIG. 7. Briefly stated, outer housing 320 can have a narrow front contour 323. That is, it can have a front contour 323 with a smaller diameter. This front end can engage canted coil spring 150 during insertion of connector insert 300 into connector receptacle 100. A widening contour 325 of outer housing 320 can follow narrow front contour 323. This can increase the diameter of canted coil spring 150. A narrower trench 327 can follow widening contour 325 of outer housing 320. Canted coil spring 150 can be positioned in a constrained groove 153 (shown in FIG. 7) in trench 327, where canted coil spring 150 is against outer housing 320 and between top housing portion 110 and bottom housing portion 120 (both shown in FIG. 3) when connector insert 300 is fully inserted in connector receptacle 100. In this state, canted coil spring 150 might only provide nominal resistance to further insertion but can provide a large resistance to an extraction of connector insert 300. That is, canted coil spring 150 can then provide a large retention force on connector insert 300 helping to keep connector insert 300 in place in connector receptacle 100 during operation. Again, further details of the interaction between canted coil spring 150 and outer housing 320 are shown below in FIG. 7.

Figure 6:
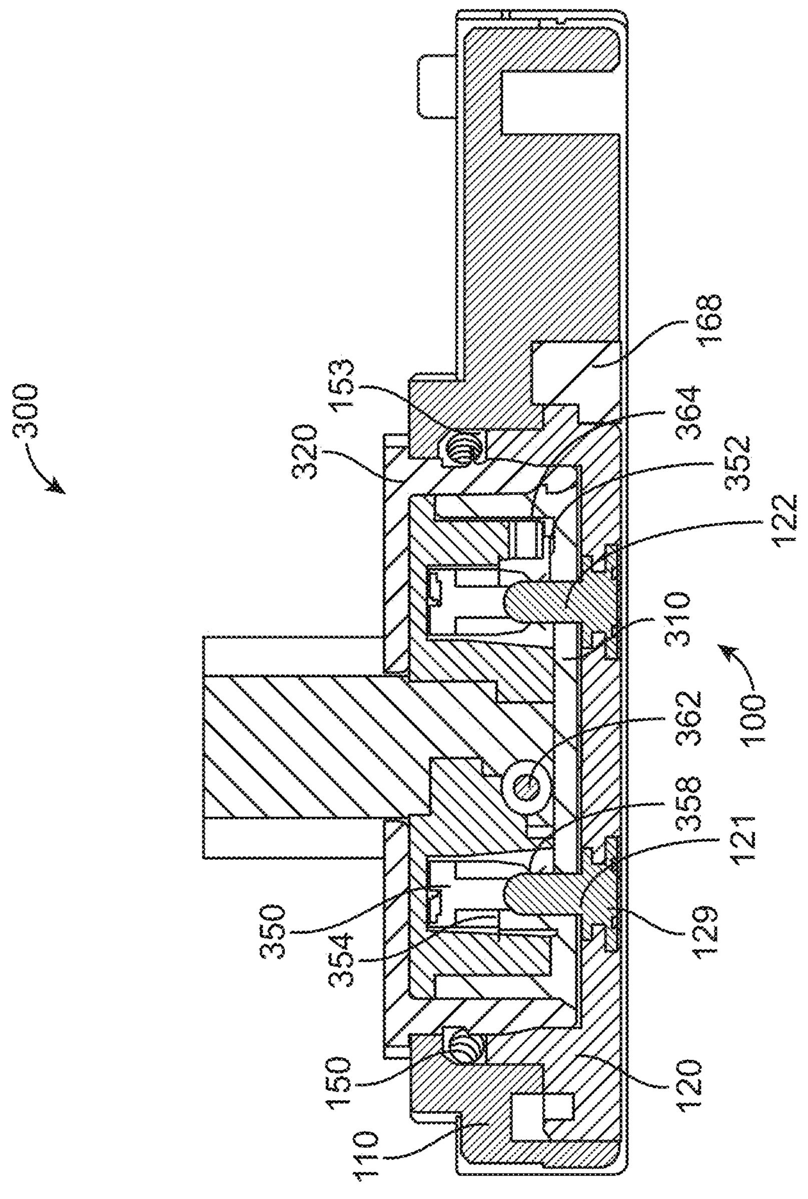
FIG. 6 illustrates a cross-section view of a power connector system according to an embodiment of the present invention.

FIG. 6 illustrates a cross-section view of a power connector system according to an embodiment of the present invention. Connector insert 300 is shown as being fully inserted into connector receptacle 100. Power prong 121, power prong 122, and power prong 123 (shown in FIG. 2) can have their base portions 129 insert molded in bottom housing portion 120. Power prong 121, power prong 122, and power prong 123 can extend from bottom housing portion 120, through contact cover 310, and be contacted by contacts 350. Contacting portions 358 of petals 354 can physically and electrically connect to power prongs 121, 122, and 123. Crimps 364 can be formed around ends of conductors 362 and can be soldered or spot or laser-welded to tabs 352 of contacts 350. Lead frame housing 168 can fit against bottom housing portion 120 and between bottom housing portion 120 and top housing portion 110.

Canted coil spring 150 can be positioned in groove 153 between top housing portion 110 and bottom housing portion 120. Canted coil spring can engage an outside surface of outer housing 320. This interaction can provide asymmetric insertion and extraction forces. Specifically, this interaction can provide a low insertion force whereby connector insert 300 is easily inserted into connector receptacle 100 but a large extraction force whereby connector insert 300 is held in place in connector receptacle 100 during operation. Further details of this interaction are shown in the following figure.

FIG. 7 illustrates a portion of a cross-section view of a power connector system according to an embodiment of the present invention. In this example, connector insert 300 (shown in FIG. 6) is fully inserted in connector receptacle 100 (shown in FIG. 1.) Canted coil spring 150 can be positioned in groove 153 in connector receptacle 100 between top housing portion 110 and bottom housing portion 120.

Canted coil spring 150 can have the following properties: First, when canted coil spring 150 is relaxed or in a groove geometry that allows the cant-direction to flip into one of two stable directions, canted coil spring 150 might only provide a nominal resistance to an insertion and extraction; and second, when canted coil spring 150 is in a constrained groove and compressed radially, canted coil spring 150 can enter a state where canted coil spring 150 provides a nominal resistance to an insertion (more specifically, a nominal resistance to movement in the same direction) and a large resistance to an extraction (more specifically, a large resistance to movement in the opposing direction). As such, when connector insert 300 is inserted into connector receptacle 100, canted coil spring 150 can be positioned in a constrained groove and can provide minimal insertion resistance. Once connector insert 300 is in place in connector receptacle 100, so long as canted coil spring 150 remains in the constrained groove, canted coil spring 150 can provide a large resistance to an extraction of connector insert 300. This can help to avoid an inadvertent extraction of connector insert 300 from connector receptacle 100. In order to release connector insert 300, the groove geometry can be altered, thereby allowing the cant-direction to flip on extraction reducing the resistance to the extraction of connector insert 300.

As connector insert 300 is inserted into connector receptacle 100, canted coil spring 150 can encounter front contour 323, which can be a narrow portion of outer housing 320. As connector insert 300 is inserted further into connector receptacle 100, canted coil spring 150 can encounter contour 325, which can be a widening in a diameter of outer housing 320. Since canted coil spring 150 is in the relaxed state and not compressed radially in a constrained groove, only a nominal insertion force is needed to insert connector insert 300 into connector receptacle 100. As canted coil spring 150 engages widened contour 325, canted coil spring 150 can be stretched over the larger diameter of contour 325. Once canted coil spring 150 reaches narrowed trench 327 of outer housing 320, connector insert 300 is fully inserted into connector receptacle 100. At this position, canted coil spring 150 can enter a constrained groove 153 between outer housing 320, top housing portion 110 and bottom housing portion 120, and can provide a significant resistance to an extraction of connector insert 300. Connector insert 300 can be extracted from connector receptacle 100 by exerting sufficient force on connector insert 300. After contour 325 passes through canted coil spring 150, canted coil spring 150 can relax to the narrower diameter of narrow front contour 323. This can allow the cant-direction of canted coil spring 150 to flip and cause canted coil spring 150 to provide only a nominal resistance to the further extraction of connector insert 300 from connector receptacle 100. Once connector insert 300 has been fully extracted from connector receptacle 100, canted coil spring 150 can be in a relaxed state and can provide a nominal resistance to the next insertion of connector insert 300.

In these and other embodiments of the present invention, canted coil spring 150 can be in nonconductive groove 153 that is formed of top housing portion 110 and bottom housing portion 120. Canted coil spring 150 engages nonconductive outer housing 320 when connector insert 300 is inserted into connector receptacle 100. Tab 142 (shown in FIG. 3) can contact canted coil spring 150 to provide a path to ground through bottom shield portion 140 (shown in FIG. 3.) In these and other embodiments of the present invention, portions of groove 153 and outer housing 320 can be conductive such that canted coil spring 150 can form a portion of a conductive path for ground, neutral, power, or other power supply or signal. In these and other embodiments of the present invention, canted coil spring 150 is not grounded by tab 142 and does not provide an electrical pathway.

In these and other embodiments of the present invention, connector receptacle 100 and connector insert 300 can form pathways for power connections including ground, line (hot), and neutral. In these and other embodiments of the present invention, connector receptacle 100 and connector insert 300 can form pathways for line (hot) and neutral. In these and other embodiments of the present invention, connector receptacle 100 and connector insert 300 can form pathways for one or more signals using additional and/or existing electrical contacts and conduits, by using one or more fiber optical pathways, or by using other types of signal conveying connections and conduits.

In these and other embodiments of the present invention, contacts, shields, prongs, lead frames, and other conductive portions of a power connector can be formed by stamping, progressive stamping, forging, metal-injection molding, deep drawing, machining, micro-machining, CNC machining, screw-machining, 3-D printing, clinching, or other manufacturing process. The conductive portions can be formed of stainless steel, steel, copper, copper-titanium, phosphor-bronze, brass, nickel gold, copper-nickel, silicon alloys, or other material or combination of materials. They can be plated or coated with nickel, gold, or other material.

The nonconductive portions, such as housings, contact covers, inner insulators, strain reliefs, and other structures, can be formed using insert molding, injection molding, or other molding, 3-D printing, machining, or other manufacturing process. The nonconductive portions can be formed of silicon or silicone, polyimide, glass nylon, polycarbonate, rubber, hard rubber, plastic, nylon, liquid-crystal polymers (LCPs), ceramics, thermoplastic elastomers (TPE) or other nonconductive material or combination of materials.

Embodiments of the present invention can provide power connectors including connector receptacles that can be located in various types of devices, such as tablet computers, laptop computers, desktop computers, all-in-one computers, cell phones, storage devices, wearable-computing devices, portable media players, portable computing devices, navigation systems, monitors, adapters, and other devices, as well as corresponding connector inserts.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:

a housing having a recess defined by a sidewall and a bottom surface;

a plurality of prongs extending from a bottom surface of the recess;

a canted coil spring positioned in a groove in the sidewall;

a lead frame coupling at least two of the plurality of prongs to corresponding wires, where the lead frame extends laterally below the bottom surface; and a shield comprising a bottom shield portion below the lead frame and a top shield portion over a top of the housing, the top shield portion attached to the bottom shield portion.

2. The connector receptacle of claim 1 wherein the housing comprises a top housing portion and a bottom housing portion, the top housing portion forming a top sidewall portion, the bottom housing portion forming a bottom sidewall portion and the bottom surface.

3. The connector receptacle of claim 2 wherein the groove is between the top sidewall portion and the bottom sidewall portion.

4. The connector receptacle of claim 3 further comprising a keying feature extending from at least one of the top sidewall portion and the bottom sidewall portion in a direction parallel to the bottom surface.

5. The connector receptacle of claim 4 wherein one of the plurality of prongs is physically and electrically connected to the bottom shield portion.

6. The connector receptacle of claim 5 further comprising a tab physically and electrically connected to the bottom shield portion, wherein the tab fits in a slot in the bottom housing portion and contacts the canted coil spring.

7. The connector receptacle of claim 6 further comprising a plurality of fasteners, each passing through an opening in the bottom shield portion, an opening in the top housing portion, an opening in the top housing portion, and an opening in the top shield portion.

8. The connector receptacle of claim 7 further comprising a first tape layer between the lead frame and the bottom shield portion and a second tape layer between the first tape layer and the bottom shield portion.

9. A connector insert comprising:

a cable comprising a plurality of conductors;

a strain relief around a first end of the cable and supporting each of the plurality of conductors;

a plurality of contacts, each contact attached to one of the plurality of conductors;

an inner insulator supporting each of the plurality of contacts and corresponding attachment to one of the plurality of conductors;

a contact cover over the plurality of contacts and the inner insulator, the contact cover having a plurality of openings, each to provide access to one of the plurality of contacts; and an outer housing attached to the contact cover and around the inner insulator, the plurality of contacts, and a portion of the strain relief, wherein an outside surface includes a narrower contour near the contact cover, followed by a widening contour, followed by a trench, wherein a canted coil spring on a corresponding connector receptacle is engaged in the trench when the connector insert and the corresponding connector receptacle are mated.

10. The connector insert of claim 9 further comprising a keying feature forming an indent in a side of the connector insert.

11. The connector insert of claim 10 wherein each of the plurality of contacts comprises a tulip-shaped contact including a plurality of petals and a tab.

12. The connector insert of claim 11 wherein an end of each conductor is crimped and attached to the tab of a corresponding contact.

13. The connector insert of claim 12 wherein one of the plurality of contacts comprises a first barb, wherein the first barb is inserted into a corresponding slot in the inner insulator.

14. A power connector system comprising:

a connector receptacle comprising:

a receptacle housing having a recess defined by a sidewall and a bottom surface;

a plurality of prongs extending from a bottom surface of the recess;

a canted coil spring positioned in a groove in the sidewall;

a lead frame coupling at least two of the plurality of prongs to corresponding wires, where the lead frame extends laterally below the bottom surface; and a shield comprising a bottom shield portion below the lead frame and a top shield portion over a top of the receptacle housing, the top shield portion attached to the bottom shield portion; and a connector insert comprising:

a cable comprising a plurality of conductors;

a strain relief around a first end of the cable and supporting each of the plurality of conductors;

a plurality of contacts, each contact attached to one of the plurality of conductors and electrically connect to a corresponding one of the prongs when the connector receptacle and the connector insert are mated;

an inner insulator supporting each of the plurality of contacts and corresponding attachment to one of the plurality of conductors;

a contact cover over the plurality of contacts and the inner insulator, the contact cover having a plurality of openings, each to provide access to one of the plurality of contacts; and an outer housing attached to the contact cover and around the inner insulator, the plurality of contacts, and a portion of the strain relief.

15. The power connector system of claim 14 wherein an outside surface includes a narrower contour near the contact cover, followed by a widening contour, followed by a trench, wherein a canted coil spring on a corresponding connector receptacle is engaged in the trench when the connector insert and the corresponding connector receptacle are mated.

16. The power connector system of claim 15 wherein the receptacle housing comprises a top housing portion and a bottom housing portion, the top housing portion forming a top sidewall portion, the bottom housing portion forming a bottom sidewall portion and the bottom surface.

17. The power connector system of claim 16 wherein the groove is between the top sidewall portion and the bottom sidewall portion.

18. The power connector system of claim 17 further comprising a first tape layer between the lead frame and the bottom shield portion and a second tape layer between the first tape layer and the bottom shield portion.

19. The power connector system of claim 18 wherein each of the plurality of contacts comprises a tulip-shaped contact including a plurality of petals.

20. The power connector system of claim 19 wherein one of the plurality of contacts further comprises a first barb, wherein the first barb is inserted into a corresponding slot in the inner insulator.

* * * * *